United States Patent
Grove et al.

(10) Patent No.: US 8,072,965 B2
(45) Date of Patent: Dec. 6, 2011

(54) MODEM RELAY ORIGINATOR

(75) Inventors: Vincent Todd Grove, Concord, MA (US); Herbert Michael Wildfeuer, Santa Barbara, CA (US); Mehryar Khalili Garakani, Westlake Village, CA (US)

(73) Assignee: Cisco Technology Inc., San Jose, CA (US)

( * ) Notice: Subject to any disclaimer, the term of this patent is extended or adjusted under 35 U.S.C. 154(b) by 3210 days.

(21) Appl. No.: 10/308,592

(22) Filed: Dec. 2, 2002

(65) Prior Publication Data

US 2004/0105426 A1 Jun. 3, 2004

(51) Int. Cl.
*H04L 12/66* (2006.01)

(52) U.S. Cl. ........ 370/352; 370/358; 370/401; 709/228

(58) Field of Classification Search .......... 370/352–464; 709/227–229
See application file for complete search history.

(56) References Cited

U.S. PATENT DOCUMENTS

| | | | | |
|---|---|---|---|---|
| 7,038,817 B2 * | 5/2006 | Numata | ........................ | 358/425 |
| 7,126,711 B2 * | 10/2006 | Fruth | ........................... | 358/1.15 |
| 7,177,944 B1 * | 2/2007 | Chen et al. | .................... | 709/237 |
| 7,203,226 B1 * | 4/2007 | Rabipour et al. | ............. | 375/222 |
| 7,230,977 B1 * | 6/2007 | Somekh et al. | ............... | 375/211 |
| 2002/0118671 A1 * | 8/2002 | Staples et al. | ................. | 370/352 |
| 2003/0123466 A1 * | 7/2003 | Somekh et al. | ............... | 370/401 |
| 2003/0185230 A1 * | 10/2003 | Fisher et al. | .................. | 370/464 |

FOREIGN PATENT DOCUMENTS

| | | |
|---|---|---|
| WO | WO 01/91441 | 11/2001 |
| WO | WO 02/058351 | 7/2002 |
| WO | WO 03/096642 | 11/2003 |

OTHER PUBLICATIONS

Somekh, Oren, "Modem Over Packet Networks Technology," Electronic Product Design (epd) Publication, Nov. 2001, vol. 22, No. 11, pp. 54, 56, 58 (XP009015577).

Proposed Draft Text for D-006 version of V.MoIP, Telecommunications Industry Association (TIA), Columbia, MD., Jun. 12-14, 2002, TR-30.1/02-06-057, ITU-T Recommendation V.MOIP, "Procedures for the End-to-End Connection of V-Series DCES over an IP Network," http://ftp.tiaonline.org/TR-30/tr301/Public/TR-30.1/2002-06Columbia/10206058.zip.

ITU T (Telecommunication Standardization Sector of ITU) H.323 (Nov. 2000) Series H: Audiovisual and Multimedia Systems, Infrastructure of audiovisual services—Systems and terminal equipment for audiovisual services, "Packet-based multimedia communications systems" (242 pages).

* cited by examiner

*Primary Examiner* — Hassan Phillips
*Assistant Examiner* — Mark A Mais
(74) *Attorney, Agent, or Firm* — Marger, Johnson & McCollom, P.C.

(57) ABSTRACT

A network device and a method for its operation are disclosed. The network device has a first interface to a client device to allow reception of client device signals and a second interface to a packet network to allow transmission and reception of modem relay signals. A processor translates between modem relay signals received or transmitted on the second interface and client device signals received or transmitted on the first interface. In one implementation the modem relay originator and the client device are collapsed into one device and the first interface is implemented as a virtual interface.

27 Claims, 3 Drawing Sheets

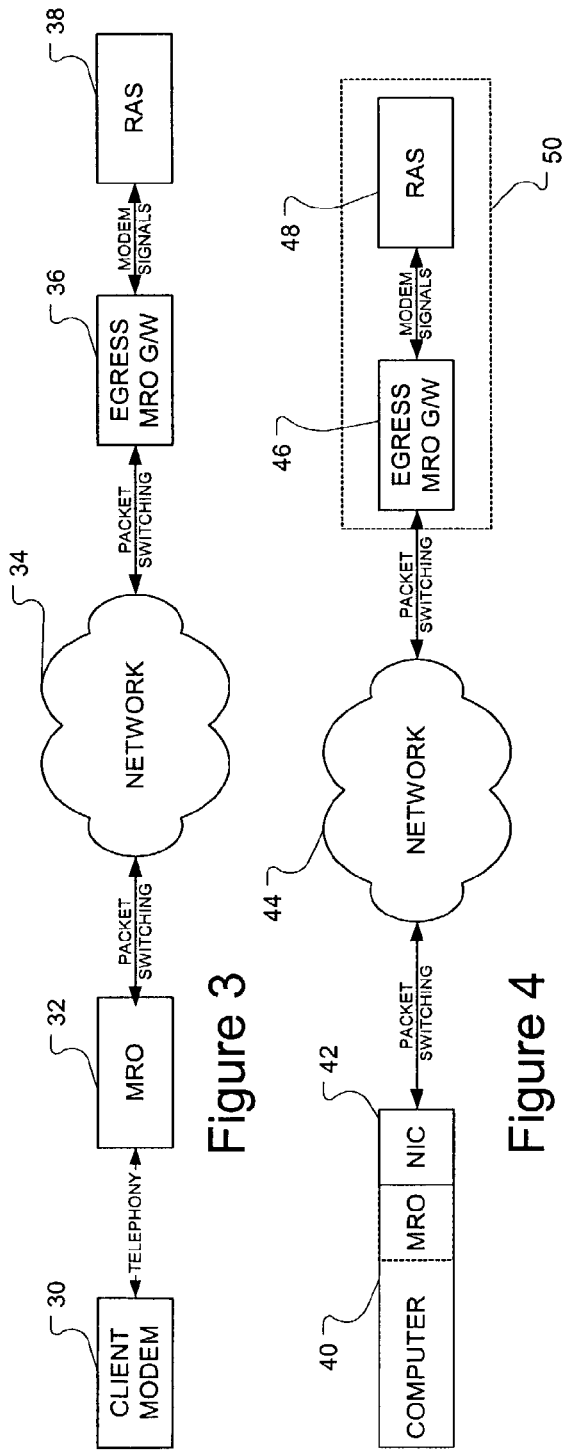

MODEM RELAY ORIGINATOR

BACKGROUND

1. Field

This disclosure relates to modem relay signals over packet networks, more particularly to methods and devices to originate modem relay signals.

2. Background

The International Telecommunications Union (ITU) is in the process of approving a new standard for modem sessions over packet networks. This may be referred to as modem over Internet Protocol (V.MoIP) or modem relay. The data network, such as an IP network, relays the signals that are normally exchanged between modems. Modem signals are received by an ingress gateway, encapsulated and transmitting across the data network. An egress gateway then takes the packets received containing the encapsulated signals and converts them back to modem signals, then transmits them to the receiving device, such as a Remote Access Server (RAS).

However, some users have packet network access, such as through DSL (Digital Subscriber Loop) or cable modems. These users typically have to use a 'standard' modem if they want to access an RAS device, since the RAS devices require modem signaling, which may also be referred to as PSTN (public switched telephone network) signaling. This eliminates any advantage they may gain from their packet network access. It would be useful if there were other alternatives to allow users access to a packet network interface with the ability to perform modem relay.

SUMMARY

A network device and a method for its operation are disclosed. The network device has a first interface to a client device to allow transmission and reception of client device signals and a second interface to a packet network to allow transmission and reception of modem relay signals. A processor translates between modem relay signals received or transmitted on the second interface and client device signals received or transmitted on the first interface.

In one embodiment the client device is a computer and the first interface is a serial interface.

In another embodiment the client device is a modem and the first interface is a telephone interface.

In yet another embodiment the client device is a network access card and the first interface is a virtual interface.

BRIEF DESCRIPTION OF THE DRAWINGS

Embodiments of the invention may be best understood by reading the disclosure with reference to the drawings, wherein:

FIG. 3 shows an alternative embodiment of a modem relay transmission path including a modem relay originator.

FIG. 4 shows an alternative embodiment of a modem relay transmission path including a modem relay originator, where modem relay gateway and end-device functionality are implemented within one device.

FIG. 5 shows an embodiment of a modem relay originator.

DETAILED DESCRIPTION OF THE EMBODIMENTS

Figure 1:
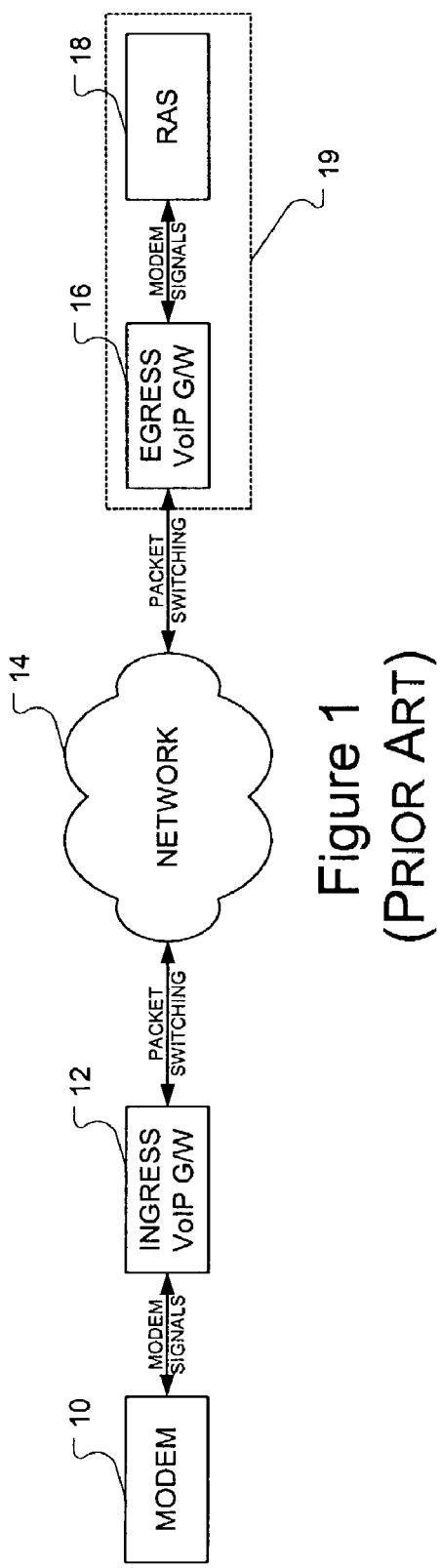
FIG. 1 shows a prior art embodiment of a modem passthrough transmission path using Voice over IP gateways.

An example of a network capable of transmitting modem signals over a network in accordance with the prior art is shown in FIG. 1. Client modem 10 dials the ingress VoIP gateway 12. The ingress VoIP gateway 12 then connects to the egress VoIP gateway 16, which dials the remote access server (RAS) 18 based on the information provided by the ingress gateway. Both gateways proceed to negotiate their capabilities during call setup using out-band signaling such as H.323, session initiation protocol (SIP), or media gateway control protocol (MGCP). Once the gateways' capabilities are known, the modems proceed to negotiate. Usually, the answer modem (RAS) sends an Answer tone to start the modem physical layer train-up.

The ingress VoIP gateway 12 accepts the modem tone signals and converts them to packet data and transmits them across the network 14 to the egress VoIP gateway 16. Egress VoIP gateway 16 then reconverts the data back into modem tones via remodulation and transmits those tones to the remote access server (RAS) 18. The process is then performed in the reverse direction to facilitate call setup and negotiation between the modem 10 and the remote access server (RAS) 18.

In an alternative embodiment in accordance with the prior art, the egress gateway and the remote access server are combined into one device referred to as a modem relay aggregator (MRA) 19. The MRA 19 generates and provides the modem response tones necessary to communicate with the client modem 10. In one embodiment, the MRA 19 has a digital signal processor that generates the modem response tones necessary as is disclosed in U.S. patent Ser. No. 10/144,154, filed May 10, 2002, and owned by the assignee of the present invention. Another approach to an MRA that does not have a DSP is discussed in U.S. patent application Ser. No. 10/209,052, filed Jul. 30, 2002, and owned by the assignee of the present invention.

In either of these circumstances, the client modem must dial into the RAS 18 or the MRA 19. This has distinct disadvantages, especially for those users that have access to packet networks through broadband connections, such as cable access or DSL (digital subscriber loop). These users must use a 'standard' modem to dial the ingress gateway, in order to provide the necessary tones to communicate with either the RAS or the MRA on the other end of the circuit.

Figure 2:
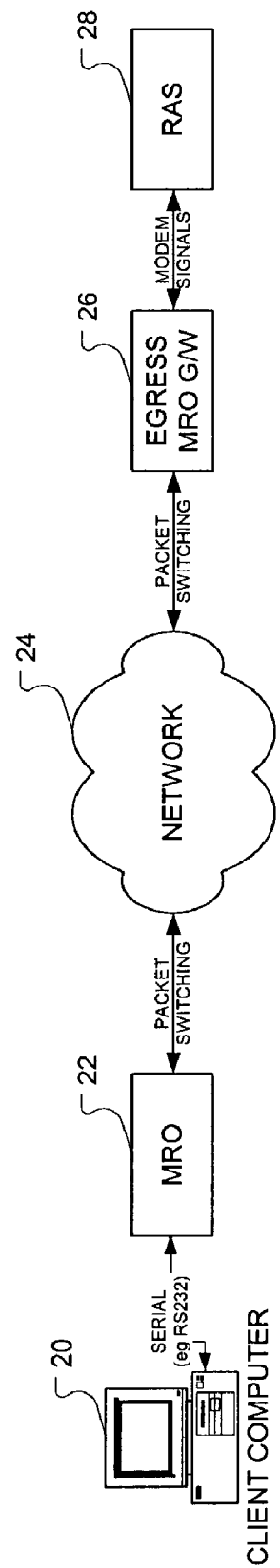
FIG. 2 shows an embodiment of a modem relay transmission path-including a modem relay originator (MRO).

However, it is possible to offer a device on the client end of the circuit that eliminates that need. Embodiments of this device will be referred to as a Modem Relay Originator, or MRO. An example of a circuit including an MRO is shown in FIG. 2. The MRO 22 lays between the client computer 20 and the network 24. Note that the MRO may be an integrated part of the computer, but is shown separately for ease of discussion. Similarly, the 'computer' 20 may be any type of device that allows a user to interact with the network, such as a personal computer, a personal digital assistant (PDA), a network appliance, an "Internet phone," etc.

In the embodiment of FIG. 2, the MRO provides a serial interface to the client computer 20, such as a PC. The MRO 22 also provides a packet interface to the packet network 24. The MRO collapses the functionality of the client modem and the ingress gateway into one device. There is no need to modulate the data stream into PSTN signaling, because the device takes the digital data from the client device and delivers digital data as output. The egress MRO gateway 26, if an MRA is not used, would be responsible for modulating the data into the necessary PSTN signals for reception by the RAS 28.

In this example, the MRO 22 would compress the data using one of several available compression techniques, and encapsulates the data into packets addressed to the egress, or terminating, MRO gateway 26. More than likely the packets will be encapsulated into SPRT (Simple Protocol Relay Transport) packets for transmission across the network 24. An example of a method to operate the MRO device will be discussed with regards to FIG. 6.

Alternative implementations of the MRO 22 of FIG. 2 may also occur. For example, as shown in FIG. 3, the client modem 30 may interact with the MRO 32 through a telephony interface. Note that in most cases the embodiment of FIG. 2 would be instead of a packet-based access device rather than in addition to it, for example the MRO would be integrated into the cable modem. In this instance, the MRO 32 would have a different client device interface. The client device in this case, the client modem 30, will have a telephony interface, such as an RJ11 jack. The client interface would then be a telephony interface, with the packet interface remaining the same as the MRO shown in FIG. 2. The egress MRO gateway 36 and the RAS 38 would function as in FIG. 2.

In yet another embodiment, the MRO could be implemented similar to a 'soft modem.' Soft modems are generally software applications that run on a user's computer. They use the processor, or a digital signal processor already part of the computer, to generate the necessary signals and use the audio card to produce the necessary signals. The implementation of a 'soft MRO' would be similar. An example of this is shown in FIG. 4.

In FIG. 4, a computer 40 has an MRO application 42 that interacts with the computer's network interface card (NIC), such as an Ethernet card. The client device interface in this case will be referred to as a network interface. The interface is not an actual hardware interface, but an interface implemented in software, referred to here as a 'virtual' interface. The user would then interact with the network via the Ethernet or other network access port on the computer to transmit the necessary signals across the network 44 to 'dial-in' to the RAS 48 via the egress MRO gateway 46. An example of this would be someone visiting a hotel room or another premises where broadband access is provided, but the user's access to their home network is via an RAS server 48. The user could then take advantage of the network access provided in the hotel room, without having to dial out of the room.

With regard to any of the previous embodiments, the functionality of an MRO may be added to existing devices. For example, in the case of a separate MRO as discussed with regards to FIG. 2, an existed device could be 'converted' to an MRO by providing an article of machine-readable media upon which resides code that, when executed, implements the methods of the invention.

It must be noted in any of the above embodiments that if the RAS 48 and egress MRO gateway 46 with an MRA 50, the connection is packet-based from premises to premises, avoiding the use of the PSTN and the associated problems that can occur with PSTN service. Other advantage may also arise. For example, small and medium-sized businesses can only provide virtual private networks (VPN) to their remote or traveling employees. The only secure access is via Authorization, Authentication and Accounting (AAA) access associated with traditional dial. With an MRO device, these employees can use the same device for broadband network access to access the company intranet via the RAS.

Similarly, access charges may be reduced if the RAS is within the local calling region of the terminating voice gateway. As far as the RAS 'knows' an employee accessing the RAS from the remote site via the packet network is accessing the RAS from the terminating gateway. If the call between the terminating gateway and the RAS is a local call, the access charges for 800 service will be reduced. This is made possible by providing the employee packet-based access with the use of an MRO.

An example of an MRO 52 is shown in more detail in FIG. 5. The MRO has a first interface, 54, that provide interface with the client device. As discussed previously, examples of this interface include serial, telephony and network. The processor 56 compresses and encapsulates the data and transmits it through the second interface 58 to the packet network. The second interface 58 is a packet interface.

Figure 6:
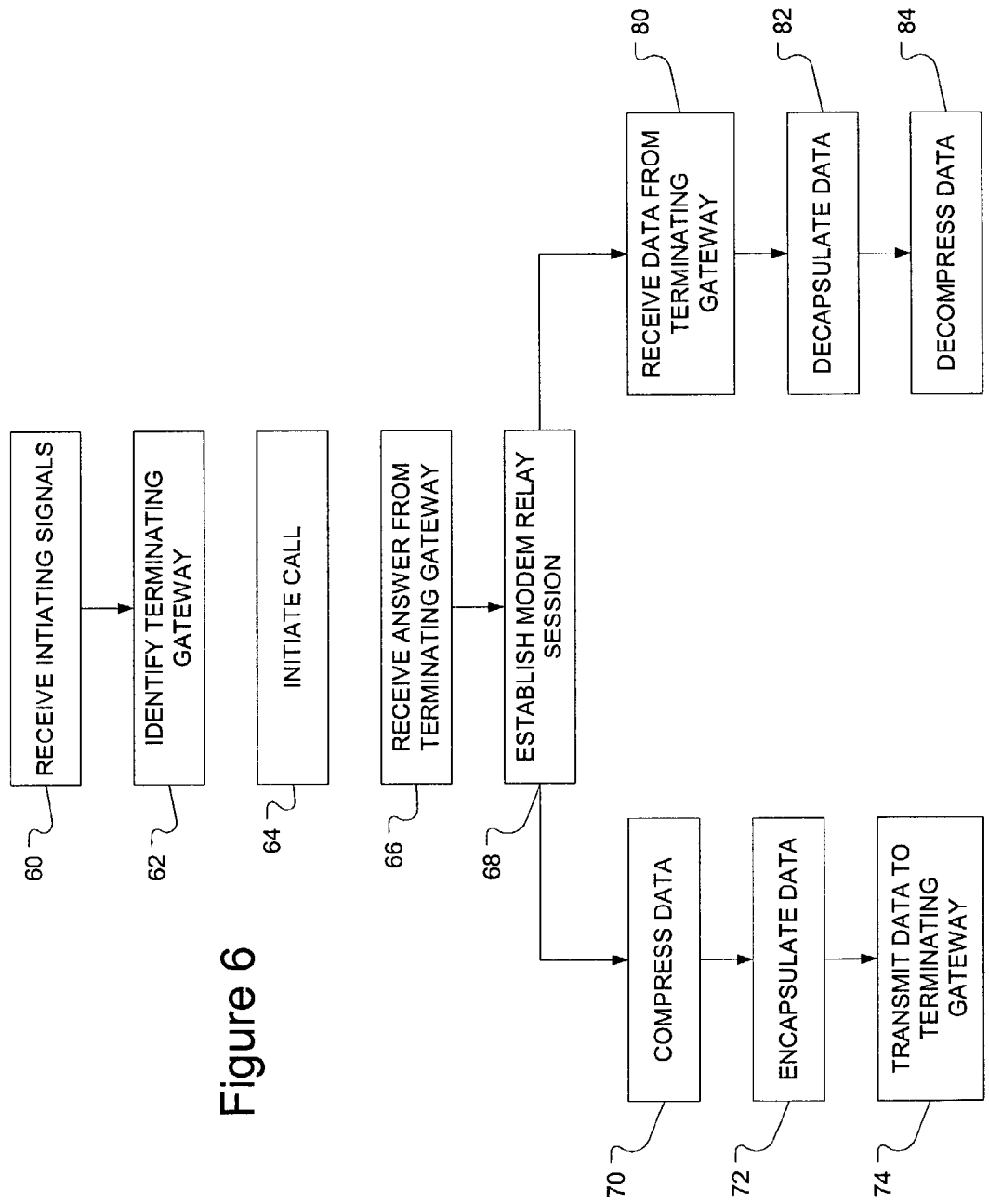
FIG. 6 shows a flowchart of an embodiment of a method to provide modem relay capability.

A flowchart of an embodiment of a method of operating an MRO device is shown in FIG. 6. The MRO receives signals from the client device indicating that a call needs to be initiated at 60. The MRO then identifies the terminating voice gateway 62. This may be achieved through a dial plan that associates the terminating phone number received from the client device with a terminating gateway. The MRO initiates a VoIP call with the terminating gateway at 64. The terminating gateway would then dial the RAS, if an MRA is not used, and receive the answer tones from the RAS. The terminating gateway would then send the 'answer' signals to the MRO, received by the MRO at 66. The 'answer' received from the terminating gateway will also indicate that the MRO should transition to modem relay.

The modem relay session is established at 68 in accordance with the ITU recommendations. The MRO would then function as both the client modem and the originating gateway. For a point-to-point protocol session (PPP), in a specific example, the RAS will perform the necessary AAA process mentioned above and assigns an IP address for the MRO to use for the session.

Once the session is established at 68, data is transmitted and received by the MRO for the client device. In the case of transmission, the MRO would compress data at 70, according to a standard data compression scheme, which are well known. The MRO would then encapsulate data in accordance with a standardized protocol, such as SPRT, at 72 and then transmits the data to the terminating gateway 74.

For reception of data, the MRO would receive the data from the terminating gateway at 80 and decapsulate it at 82. Decapsulation typically involves stripping the SPRT headers for example, if SPRT is used. The data is then decompressed at 84 and delivered to the client device.

In this manner, user's can avoid using the PSTN to make contact with an RAS for access to networks from remote sites. Users can take advantage of broadband access at their remote sites to gain access to the RAS at their home site.

Thus, although there has been described to this point a particular embodiment for a method and apparatus for policy system load balancing and throttling in data networks, it is not intended that such specific references be considered as limitations upon the scope of this invention except in-so-far as set forth in the following claims.

What is claimed is:

1. A network device, comprising:
   a first interface to a client device to allow reception of client device signals;
   a second interface to a packet network to allow transmission and reception of modem relay signals; and
   a processor to translate between modem relay signals and client device signals without modulating the client device signals into public switched telephone network signals.

2. The network device of claim 1, wherein the client device is a computer.

3. The network device of claim 1, wherein the first interface is a serial interface.

4. The network device of claim 1, wherein the client device is a client modem.

5. The network device of claim 1, wherein the first interface is a telephone jack.

6. The network device of claim 1, wherein the client device is a network interface card.

7. The network device of claim 6, wherein the network interface card is an Ethernet card.

8. The network device of claim 1, wherein the first interface is a network interface.

9. The network device of claim 1, wherein the processor is a general-purpose processor.

10. A method of providing modem relay capability, the method comprising:
   receiving signals from a client device to initiate a network connection without using public switched telephone network signals;
   identifying a terminating gateway based upon the signals from the client device;
   initiating a packet network call with the terminating gateway;
   receiving answer signals from the terminating gateway; and
   establishing a modem relay session with the terminating gateway.

11. The method of claim 10, the method further comprising:
   receiving data intended for a remote access server associated with the terminating gateway from the client device;
   compressing the data, resulting in compressed data;
   encapsulating the data, resulting in encapsulated, compressed data; and
   transmitting the encapsulated, compressed data to the terminating gateway.

12. The method of claim 10, the method further comprising:
   receiving encapsulated, compressed data from a terminating gateway;
   decompressing the data;
   decapsulating the data; and
   transmitting the data to a client device through an interface with the client device.

13. The method of claim 10, wherein the client device is a computer.

14. The method of claim 10, wherein the client device is a modem.

15. The method of claim 10, wherein the client device is a network interface card.

16. A network device, comprising:
   a first means for providing an interface to a client device to allow reception of client device signals;
   a second means for providing an interface to a packet network to allow transmission and reception of modem relay signals; and
   a means for translating between modem relay signals and client device signals without modulating the client device signals into public switched telephone network signals.

17. The network device of claim 16, wherein the client device further comprises a computer.

18. The network device of claim 16, wherein the first means further comprises a serial interface.

19. The network device of claim 16, wherein the client device further comprises a client modem.

20. The network device of claim 16, wherein the first means further comprises a telephone jack.

21. The network device of claim 16, wherein the first means further comprises a network interface.

22. The network device of claim 16, wherein the client device further comprises a network interface card.

23. The network device of claim 22, wherein the network interface card further comprises an Ethernet card.

24. The network device of claim 16, wherein the means for translating further comprises a general-purpose processor.

25. An article of computer-readable non-transitory storage media storing code that, when executed by a processor, causes the processor to:
   receive signals from a client device indicating initiation of a modem relay session without using public switched telephone network signals;
   identify a terminating gateway based upon the signals from the client device;
   initiate a packet network call with the terminating gateway;
   receive answer signals from the terminating gateway; and
   establish a modem relay session with the terminating gateway.

26. The article of claim 25, the code further to cause the machine to:
   receive data intended for a remote access server associated with the terminating gateway from the client device;
   compress the data, resulting in compressed data;
   encapsulate the data, resulting in encapsulated, compressed data; and
   transmit the encapsulated, compressed data to the terminating gateway.

27. The article of claim 25, the code further to cause the machine to:
   receive encapsulated, compressed data from a terminating gateway;
   decompress the data;
   decapsulate the data; and
   transmit the data to a client device through an interface with the client device.

* * * * *